(12) United States Patent
Frangakis et al.

(10) Patent No.: US 10,096,041 B2
(45) Date of Patent: Oct. 9, 2018

(54) METHOD OF ADVERTISING TO A TARGETED BUYER

(71) Applicants:Jonathan Christian Frangakis, Jersey City, NJ (US); Gabriel Alan Frangakis, Stamford, NJ (US)

(72) Inventors: Jonathan Christian Frangakis, Jersey City, NJ (US); Gabriel Alan Frangakis, Stamford, NJ (US)

(73) Assignee: The Spoken Thought, Inc., New York, NY (US)

( * ) Notice: Subject to any disclaimer, the term of this patent is extended or adjusted under 35 U.S.C. 154(b) by 0 days.

(21) Appl. No.: 13/956,209

(22) Filed: Jul. 31, 2013

(65) Prior Publication Data

US 2014/0040031 A1 Feb. 6, 2014

Related U.S. Application Data

(60) Provisional application No. 61/677,520, filed on Jul. 31, 2012.

(51) Int. Cl.
*G06Q 30/00* (2012.01)
*G06Q 30/02* (2012.01)

(52) U.S. Cl.
CPC ..... *G06Q 30/0255* (2013.01); *G06Q 30/0261* (2013.01)

(58) Field of Classification Search
CPC .......... G06Q 30/0255; G06Q 30/0261; G06Q 30/0265; G06Q 30/0266; G06Q 30/0269
USPC .......... 705/14.53, 14.58, 14.62, 14.63, 14.66
See application file for complete search history.

(56) References Cited

U.S. PATENT DOCUMENTS

| | | | | |
|---|---|---|---|---|
| 5,689,431 | A * | 11/1997 | Rudow | A63B 24/0021 340/990 |
| 6,795,707 | B2 * | 9/2004 | Martin et al. | 455/446 |
| 7,111,010 | B2 * | 9/2006 | Chen | |
| 7,620,026 | B2 * | 11/2009 | Anschutz | G06Q 30/02 370/332 |
| 7,672,937 | B2 * | 3/2010 | Madhavan | G06Q 30/02 705/14.49 |
| 8,010,601 | B2 | 8/2011 | Jennings | |
| 8,073,460 | B1 * | 12/2011 | Scofield | G06Q 30/02 455/414.1 |
| 8,208,943 | B2 * | 6/2012 | Petersen | G06Q 10/10 455/453 |
| 8,214,390 | B2 * | 7/2012 | Watfa | G06F 17/30702 707/756 |
| 8,265,658 | B2 | 9/2012 | Issa | |
| 8,321,509 | B2 | 11/2012 | Jennings | |

(Continued)

FOREIGN PATENT DOCUMENTS

| | | | | |
|---|---|---|---|---|
| WO | WO-2007104237 A1 * | 9/2007 | | G06Q 30/02 |

OTHER PUBLICATIONS

Lawson, Stephen. Ten Ways Your Smartphone Knows Where You Are. Apr. 6, 2012. https://www.pcworld.com/article/253354/ten_ways_your_smartphone_knows_where_you_are.html. Retrieved online May 12, 2018 (Year: 2012).*

*Primary Examiner* — James A Reagan
(74) *Attorney, Agent, or Firm* — Kristofer E. Elbing

(57) ABSTRACT

A method of advertising to a targeted consumer, via an application based consumer profiling algorithm which determines the interests of a consumer in a particular geographical position then queues relevant pre-loaded advertisements on an out-of-home (OOH) medium.

23 Claims, 3 Drawing Sheets

(56) References Cited

U.S. PATENT DOCUMENTS

| | | |
|---|---|---|
| 8,417,780 B2 | 4/2013 | Jennings |
| 8,473,512 B2 | 6/2013 | Petersen |
| 8,495,065 B2 | 7/2013 | Petersen |
| 8,554,770 B2 | 10/2013 | Purdy |
| 8,560,608 B2 | 10/2013 | Petersen |
| 8,566,309 B2 | 10/2013 | Jennings |
| 8,588,819 B2 | 11/2013 | Issa |
| 8,711,737 B2 | 4/2014 | Kandekar |
| 8,723,859 B1* | 5/2014 | Hirsch ................. G09G 3/3406 345/1.3 |
| 8,782,560 B2 | 7/2014 | Purdy |
| 8,825,074 B2 | 9/2014 | Petersen |
| 8,898,288 B2 | 11/2014 | Petersen |
| 8,918,398 B2 | 12/2014 | Petersen |
| 8,924,479 B2 | 12/2014 | Jennings |
| 8,954,090 B2* | 2/2015 | Cochran ................ H04W 4/029 455/456.1 |
| 9,046,987 B2 | 6/2015 | Kandekar |
| 9,053,169 B2 | 6/2015 | Purdy |
| 9,092,641 B2 | 7/2015 | Petersen |
| 9,098,723 B2 | 8/2015 | Petersen |
| 9,161,157 B2 | 10/2015 | Evans |
| 9,203,793 B2 | 12/2015 | Kandekar |
| 9,237,199 B2 | 1/2016 | Jennings |
| 9,300,704 B2 | 3/2016 | Petersen |
| 9,338,601 B2 | 5/2016 | Issa |
| 9,397,890 B2 | 7/2016 | Petersen |
| 9,407,590 B2 | 8/2016 | Jennings |
| 9,407,598 B2 | 8/2016 | Kandekar |
| 9,468,031 B2 | 10/2016 | Evans |
| 2002/0046122 A1* | 4/2002 | Barber .................. G06Q 30/06 705/17 |
| 2002/0123928 A1* | 9/2002 | Eldering ................ G06Q 30/02 705/14.52 |
| 2003/0060897 A1* | 3/2003 | Matsuyama et al. ............. 700/1 |
| 2003/0126013 A1* | 7/2003 | Shand ............................. 705/14 |
| 2008/0004953 A1* | 1/2008 | Ma et al. ....................... 705/14 |
| 2008/0301166 A1* | 12/2008 | Sugiyama .............. G06Q 30/02 |
| 2008/0318591 A1* | 12/2008 | Oliver ..................... G01S 3/46 455/456.1 |
| 2009/0049090 A1* | 2/2009 | Shenfield ............... G06Q 30/02 |
| 2009/0084840 A1* | 4/2009 | Williams ............... G06Q 30/00 235/379 |
| 2009/0089120 A1* | 4/2009 | Terui ................................ 705/7 |
| 2009/0101706 A1* | 4/2009 | Boyd ..................... G06Q 30/02 235/380 |
| 2010/0198814 A1 | 8/2010 | Petersen |
| 2010/0198917 A1 | 8/2010 | Petersen |
| 2011/0035282 A1* | 2/2011 | Spatscheck et al. ........ 705/14.58 |
| 2012/0041983 A1 | 2/2012 | Jennings |
| 2012/0046049 A1 | 2/2012 | Curtis |
| 2012/0046068 A1 | 2/2012 | Katpelly |
| 2012/0046995 A1 | 2/2012 | Petersen |
| 2012/0047152 A1* | 2/2012 | Purdy ................ G06Q 30/0204 707/754 |
| 2012/0047448 A1 | 2/2012 | Amidon |
| 2012/0047565 A1 | 2/2012 | Petersen |
| 2012/0063367 A1 | 3/2012 | Curtis |
| 2012/0064919 A1* | 3/2012 | Purdy .................... G06Q 50/01 455/456.3 |
| 2012/0066067 A1 | 3/2012 | Curtis |
| 2012/0066138 A1 | 3/2012 | Curtis |
| 2012/0066303 A1 | 3/2012 | Purdy |
| 2013/0017843 A1 | 1/2013 | Jennings |
| 2013/0054618 A1 | 2/2013 | Petersen |
| 2013/0159869 A1* | 6/2013 | Faraji ..................... G06Q 50/00 715/738 |
| 2013/0189953 A1* | 7/2013 | Mathews .............. H04W 12/06 455/411 |
| 2013/0210399 A1 | 8/2013 | Cloutier |
| 2014/0089092 A1* | 3/2014 | Kilmer ............... G06Q 30/0269 705/14.58 |
| 2014/0280576 A1* | 9/2014 | Cowan .................. H04L 67/306 709/204 |
| 2014/0289679 A1 | 9/2014 | Purdy |
| 2015/0074214 A1 | 3/2015 | Petersen |
| 2016/0036639 A1 | 2/2016 | Petersen |

\* cited by examiner

METHOD OF ADVERTISING TO A TARGETED BUYER

TECHNICAL FIELD OF THE INVENTION

The present disclosure relates generally to a method of targeting consumers with relevant advertisements on OOH media

BACKGROUND OF THE INVENTION

Out-of-Home Media (OOHM) is commonly used to deliver marketing messages in advertisements to consumers driving or walking passed digital signage as well as individuals present in a particular area for an extended period, a captive audience. Currently, the content of these advertisements is directed towards any passer-by in anticipation that at least some will notice the advertisement and have a need for the product/service being marketed.

SUMMARY OF THE INVENTION

A method to advertise statistically relevant products and services to a targeted consumer is disclosed herein. The method involves identifying a consumer's interests based on browsing and retail history via a Smartphone based application. Pre-loaded advertisements stored within the OOHM processors will be queued based on the consumer's profile. Marketing entities will have the ability to determine interests that will queue marketing images and videos directed to the consumer whose interest align with the product or service being advertised. The number of targeted consumers that were geographically able to see a marketing entity's advertisements will be recorded and tracked for billing purposes. This method further involves offering market analytics and research to subscribing marketing entities.

BRIEF DESCRIPTION OF DRAWINGS

Features and advantages of the present disclosure will become apparent by reference to the following detailed description and drawings. It is to be understood that the system can work with other components that are not identical but can be substituted for a similar purpose to the component pictured and that method is disclosed herein as well. For the sake of brevity, components with previously described functions may or may not be described in connection with other drawings in which they appear.

DETAILED DESCRIPTION OF THE PREFERRED EMBODIMENTS

Examples of the method disclosed herein may be used to direct relevant OOHM (such as digital signage or gas station television) advertisements to targeted consumers that are geographically located in an area physically able to view the advertisement at the time of display, known as the advertisement's viewing area. In contrast to current OOHM advertising in which a single marketing message is displayed to all consumers who pass through the medium's viewing area, this advertising scheme will improve the efficiency of OOHM by displaying advertisements to consumers statistically shown to consider the product or service being marketed as relevant thus making the consumer a targeted buyer. This will be accomplished when the digital OOHM displays marketing images and videos in real time that are relevant to one or several consumers in the medium's viewing area.

Figure 1:
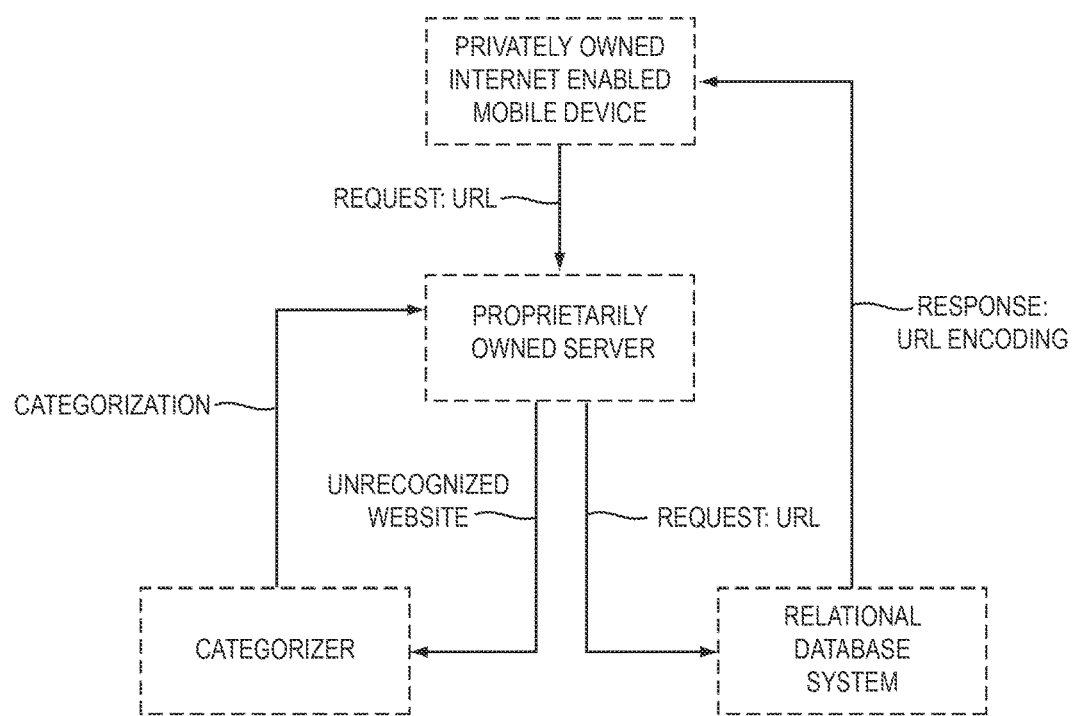
FIG. 1 is a schematic diagram depicting the method in which the invention will categorize websites in order to construct the Continuously Refining Online Genotype (CROG) necessary for the function of the invention.
Figure 2:
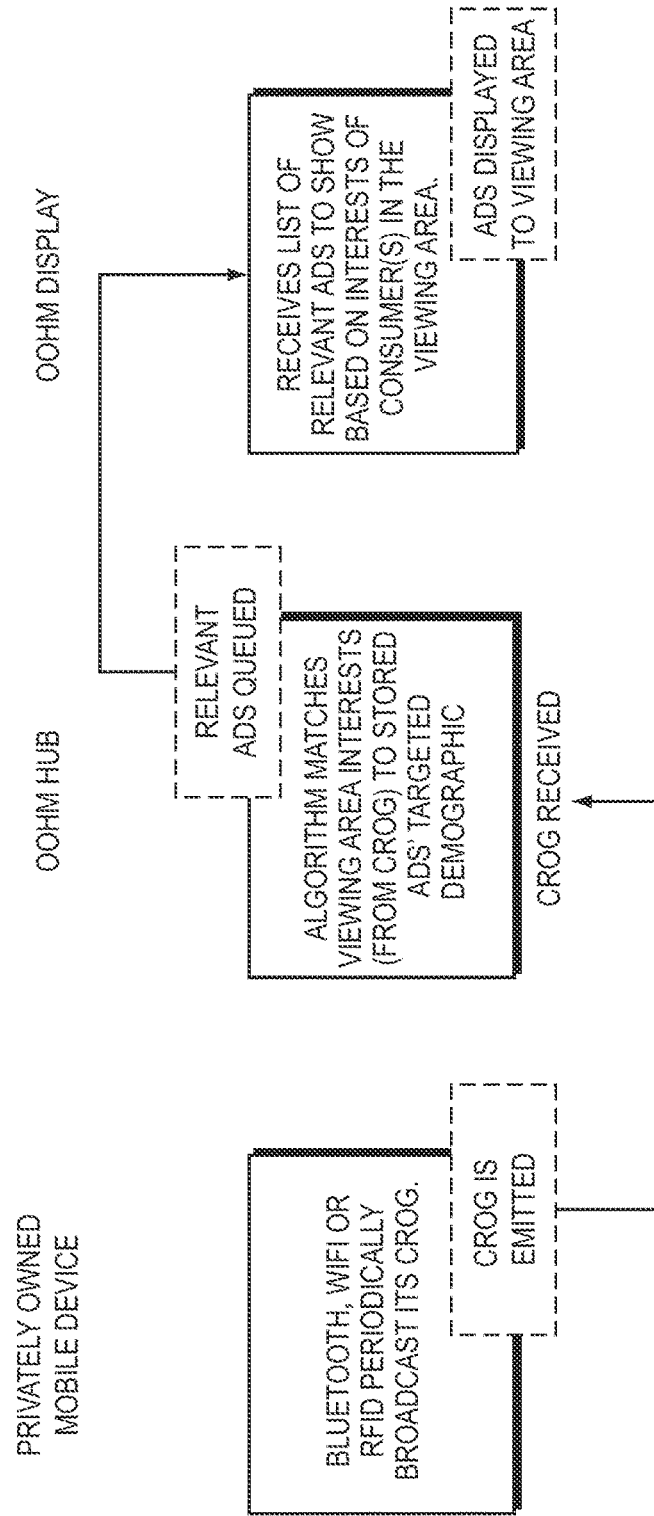
FIG. 2 is a schematic diagram depicting the method for advertising to a targeted buyer.
Figure 3:
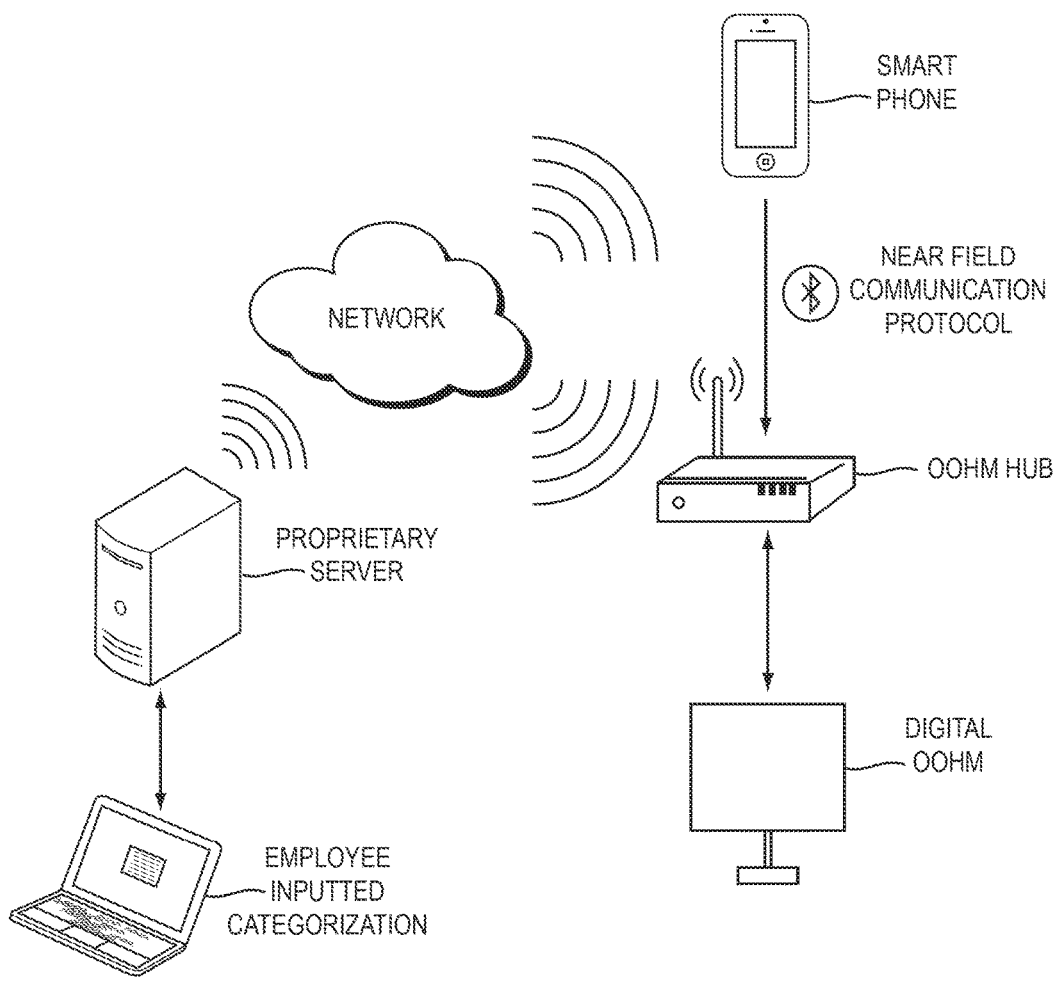
FIG. 3 is a schematic diagram depicting a system for advertising to a targeted buyer.

FIG. 1-3, described in detail below, depict a system designed to advertise to targeted buyers as defined by a marketing entity. In addition to a pre-existing carrier communication system (including but not limited one or more cell towers, one or more base stations and/or mobile switching centers, and one or more service providers), the system generally includes two key components; a cellular telephone (which could also be represented by a plurality of cellular telephones) with appropriate hardware and software to calculate and broadcast a Continuously Refining Online Genotype (CROG), and a digital OOH medium with appropriate hardware and software to receive a CROG from nearby cellular telephones (ping) and receive, store and queue marketing material based on received CROG input. It is to be understood, however, that additional components and/or systems not shown here could be employed in the method disclosed herein.

When a cellular telephone is properly equipped the user's web browsing and retail data will be collected and analyzed via an algorithm designed to develop the user's CROG, defined as a weighted identification number which constantly refreshes/refines and identifies an individual consumer based on his or her consumer and web-browsing habits. Each CROG is made up of characters in a predetermined order which reflect the web-browsing and purchasing habits of the user. An example of storing consumer data is as follows:

| POSITION | DESCRIPTION |
|---|---|
| 1 | Delineates Male (1) or Female (2) |
| 2 | 2-digit age approximation of user |
| 3 | 2-digit index code of most frequented website |
| 4 | 1-digit relative value (0-9) of previous character associated with duration of current rank |
| 5 | 2-digit index code of most frequented e-commerce site |
| 6 | 1-digit relative value (0-9) of previous character associated with duration of current rank |
| 7 | 2-digit index code of most commonly purchased product/service |
| 8 | 1-digit relative value (0-9) of previous character associated with duration of current rank |
| 9 | 2-digit index code of $2^{nd}$ most frequented website |
| 10 | 1-digit relative value (0-9) of previous character associated with duration of current rank |
| 11 | 2-digit index code of $2^{nd}$ most frequented e-commerce site |
| 12 | 1-digit relative value (0-9) of previous character associated with duration of current rank |
| 13 | 2-digit index code of $2^{nd}$ most commonly purchased product/service |
| 14 | 1-digit relative value (0-9) of previous character associated with duration of current rank |

Should a lack of historical data exist, the CROG algorithm can 'zero-out' certain characters which are ignored by the OOHM in calculating relevant advertisements to display. It is understood that the system can operate without this function and that method is disclosed herein as well. It also is to be understood that other methods of storing consumer data as an identification number could be utilized, not limited to including different criteria and/or altered positions and are disclosed herein.

During off-peak hours, properly equipped digitally addressable OOHM will receive marketing material (images/GIFs and/or videos herein referred to as ads) from service center servers via a carrier communication network which are then stored in the OOHM internal storage unit. Each ad will have a predetermined targeted buyer based on CROG characteristics which the marketing entity requests to be set as a trigger for the ad. It is understood that the marketing entity could request the provider of the method disclosed in this patent to determine the triggers for a particular ad. Once all material is stored, a receiving and processing device within the OOHM, a hub, will begin receiving local CROG. Periodically, such as, for example, every 30 seconds, a consumer's device will emit its CROG via a short-range communication protocol. When an OOHM Hub receives this 'ping', it can be assumed that the bearer of the CROG is in the viewing area. With this information, the OOHM Hub can determine which ad to queue and display. It is understood that the system could also function in a manner in which the OOHM initiates contact with the cellular phone by requesting local CROG, intermittently or continuously. In an example, the ping device could request local CROG periodically, such as, for example, every ten milliseconds. It is understood that the request could also be initiated by motion sensor and/or other devices to alert OOHM of possible targeted buyers in the viewing area. In the same manner that the cellular telephone awaits the push of information (such as an incoming call or text message) it will also receive a ping requesting its user's CROG. Once a ping is received, it can be assumed that the bearer of this device is in the OOHM's viewing area and the device will broadcast its CROG fulfilling the OOHM's request. This method is disclosed herein. For media viewable by multiple consumers, a Most Effective Advertisement (MEA) will be displayed which is calculated to be relevant to the largest number of consumers present.

If a conflict exists between two or more ads from a single consumer, meaning that a single CROG queues two or more ads based on different characters within, precedence will be given to higher (closer to the beginning) character positions. Further, advertising entities can request that particular ads be named featured advertisements thus giving them priority should a character in the CROG queue the ad regardless of its position. If a conflict exists between two or more ads from multiple consumers, meaning that multiple CROG in a viewing area queue different ads, the digital OOHM's processor unit will establish a crowd genotype. Taking into account multiple CROG characters in numerous positions, the processor will calculate the MEA; the ad that would be considered as relevant to the most CROG in the viewing area. It is understood that the system can operate without resolving conflicts from single or multiple CROG and this is included in the disclosure.

Each time an ad is displayed, the digital OOHM's internal storage unit will record the number of CROG that were in the viewing area during the time the advertisement was displayed.

The software application included in the present invention is responsible for refreshing a consumer's CID by taking into account the consumer's web browsing habits. The following technical specification walks through the cycle that occurs when a consumer visits a new website.

Indexing Websites

As depicted in FIG. 1, the application will send a query to a proprietarily operated server, sending a URL and receiving back some encoding of the website. This can be done via queries to a relational database system (or other database system) such as mySQL. The database will be structured as what those familiar with the art call a "dictionary" meaning a set of key-value pairs. In this case, the key would be the request (the URL), and the value would be the response (the encoding). In its crudest form, the encoding of the URL could be an integer, with each website mapped to a unique integer or website category, for example, e-commerce websites. However, other encodings could be used, such as a form of byte-wise nested categorization, in which each byte of the response refers to a subcategory of the previous byte. It is to be understood that other encodings could be used to categorize or associate a website to an index and those methods are included herein, While the request from the consumer only needs a website's encoding, every website must be categorized at a central server. When a website that has not been indexed is encountered, a request is sent to our server to visit and categorize the website. It is to be understood that this could be accomplished either by manual human entry or by automated webpage crawling, in which a piece of software would determine the best category for a site to be in depending on its content.

Refreshing CROG

Once the server has responded with the appropriate encoding of the visited website, there is no further need for the consumer's device to communicate with the proprietary servers directly. While the server computes the appropriate response in the previous step (Indexing Websites), it will temporarily recognize where the request originated in order to provide a response. After a response is sent, however, this information is lost. No record is stored of the URLs and/or the device IP addresses which speaks to the concern for anonymity and privacy.

The application on the phone is able to update the CROG on its own, without the need for further input from the server. The encoding of the website is inserted into the CROG, as is the level of visitation. The level of visitation is computed relative to other levels of visitation already existing in the CROG is based on how many times the website was accessed and how recently it was accessed. The phone-based application will utilize an algorithm that takes the old CROG, with the encodings of websites and levels of visitation, and computes new levels of visitation for all websites (including the newly visited websites which required server indexing) based on how many times a website was accessed and how recently it was accessed. As a CROG refreshes, websites that have been visited with less frequency can have their absolute level of visitation diminished before computing a relative level with the notion that staler data is not as useful.

Showing Ads

With the up-to-date CROG now implanted on the consumer's device, content must now be delivered to the consumer via OOHM. Periodically, such as, for example, every 30 seconds the consumer's device will emit its CROG via a short-range communication protocol, such as, for example, Bluetooth, Wi-Fi or Near Field Communication (NFC). Power to the device's Bluetooth and or Wi-Fi need only be turned on for a brief amount of time, as the data being sent is relatively compact. Thus, this process is not costly to the device's resources. Placed in various locations are hubs connected to digital OOHM that are capable of receiving these particular wireless signals. As depicted in FIG. 2, after collecting one or multiple CROG, the hubs then build a queue of advertisements to display on the OOHM. The queue is constructed by choosing an appropriate advertisement not only by matching website indices to ads, but also accounting for the importance of an ad. The importance of an ad is calculated by taking into account a) the number of people to which the ad is relevant and b) the individual importance of this ad to each person, which amounts to specifying an objective function to which the CROG of the consumers in the hub's immediate vicinity are inputs, and maximizing this objective function. A crude example of this would be a sum of the relative levels of visitation over all websites to which each ad pertains, aggregated over all the consumers. Thus, the hub is able to find which ads would not only be relevant to the most number of people, but also how relevant they are to the demographic.

From these values, all the ads the hub is able to show can be indexed by the ad's "score" according to the previously mentioned objective function. The ads are then placed into a simple priority queue, essentially a list that has been sorted by the ads' score (higher score corresponds to higher priority in the list). The hub then begins showing these ads in order, removing them from the list as they are shown, and periodically refreshing its priority queue. It is to be understood that implementing different behaviors once the priority queue is in place, such as displaying a certain ad for a longer amount of time if it is more important than other ads in the queue, is disclosed herein.

What is claimed is:

1. A digital advertising method, comprising:
   storing a set of advertisements locally at the location of a first digital out-of-home media device,
   accessing on the first user's mobile smart phone a first reference number which includes a first profile that specifies a first mobile user's interests without identifying the first user based on historical data assessed on the first mobile user's smart phone,
   accessing on the second user's mobile smart phone a second reference number which includes a second profile that specifies a second mobile user's interests without identifying the second user based on historical data assessed on the second mobile user's smart phone,
   wirelessly transmitting the first reference number from the first mobile user's smart phone that is outside of the first user' home and within a viewing area of the first digital out-of-home media device after the step of storing,
   receiving the wirelessly transmitted first reference number at the first digital out-of-home media device after the step of storing, while the first user is in the viewing area of the first digital out-of-home media device,
   wirelessly transmitting the second reference number from the second mobile user's smart phone that is outside of the second user' home and within the viewing area of the first digital out-of-home media device while both the first user and the second user are in the viewing area of the first digital out-of-home media device, after the step of storing,
   receiving the wirelessly transmitted second reference number at the first digital out-of-home media device after the step of storing, while the second user is in the viewing area of the first digital out-of-home media device,
   selecting a first relevant advertisement to display on the first digital out-of-home media device while the first and second users are in the viewing area of the first digital out-of-home device based on aggregated characteristics of the wirelessly transmitted first and second reference numbers without using an address of the first user or the first user's device, without using an address of the second user or the second user's device,
   wherein the step of selecting a first relevant advertisement based on aggregated characteristics selects the first relevant advertisement from the set of advertisements stored locally at the location of the first digital out-of-home media device in the step of storing, without requiring access to a remote server over a communication network,
   storing a first number of relevant reference numbers, including the wirelessly transmitted first and second reference numbers, wirelessly received while the first and second users are in the viewing area of the first digital out-of-home media device,
   accessing on the third user's mobile smart phone a third reference number which includes a profile that specifies a third mobile user's interests without identifying the third user based on historical data assessed on the third mobile user's smart phone,
   accessing on the fourth user's mobile smart phone a fourth reference number which includes a profile that specifies a fourth mobile user's interests without identifying the fourth user based on historical data assessed on the fourth mobile user's smart phone,
   wherein the first, second, third, and fourth profiles are different from each other
   wirelessly transmitting the third reference number from the third mobile user's smart phone that is outside of the third user' home and within a viewing area of the first digital out-of-home media device after the step of storing,
   receiving the wirelessly transmitted third reference number at the first digital out-of-home media device after the step of storing, while the third user is in the viewing area of the first digital out-of-home media device,
   wirelessly transmitting the fourth reference number from the fourth mobile user's smart phone that is outside of the fourth user' home and within the viewing area of the first digital out-of-home media device while both the third user and the fourth user are in the viewing area of the first digital out-of-home media device after the step of storing,
   receiving the wirelessly transmitted fourth reference number at the first digital out-of-home media device after the step of storing, while the fourth user is in the viewing area of the first digital out-of-home media device,
   selecting a second relevant advertisement different from the first relevant advertisement to display on the first digital out-of-home media device while the third and fourth users are in the viewing area of the first digital out-of-home device based on aggregated characteristics of the wirelessly transmitted third and fourth reference numbers without using an address of the third user, without using an address of the fourth user, without using an address of the third user's mobile device, and without using an address of the fourth user's mobile device,
   wherein the step of selecting a second relevant advertisement based on aggregated characteristics selects the second relevant advertisement from the set of advertisements stored locally at the location of the first digital out-of-home media device in the step of storing, without requiring access to a remote server over a communication network, and
   storing a second number of relevant reference numbers, including the wirelessly transmitted third and fourth reference numbers, received while the third and fourth users are in the viewing area of the first digital out-of-home media device.

2. The method of claim 1 wherein the method further comprises continuously refreshing and refining the reference number based on information received about the web user's continuously changing history of web activity.

3. The method of claim 2 wherein the method further comprises deleting all history of previous reference numbers.

4. The method of claim 1 wherein the method further comprises resolving conflicts based on a plurality of characters corresponding to the web user's online habits within the reference number, and queuing different advertisements on a the first digital out-of-home medium, by accounting for importance of the individual characters within the reference number and according priority to advertisers based upon payment for featured presentation.

5. The method of claim 1 wherein the method further comprises recording and storing data on the first digital out-of-home media device regarding which advertisements were displayed and which reference number qualities prompted the advertisement to be displayed.

6. The method of claim 1 further including a step of intermittently receiving and storing advertisements by the first digital out-of-home media device from a server via a common carrier network.

7. The method of claim 1 wherein the reference number is made up of characters in a predetermined order which reflect the web-browsing of the user.

8. The method of claim 1 wherein the step of creating a reference number is based on both online browsing and retail purchasing habits.

9. The method of claim 1 wherein the steps of selecting are based on crowd genotypes.

10. The method of claim 1 wherein the steps of wirelessly transmitting operate through NFC.

11. The method of claim 1 wherein the steps of wirelessly transmitting operate through WiFi without using a WiFi address of the first and second user's devices to identify them.

12. The method of claim 1 wherein the steps of wirelessly transmitting operate through Bluetooth.

13. A digital advertising method, comprising:
storing a set of advertisements locally at the location of a first digital out-of-home media device,
accessing on the first user's mobile smart phone a first reference number which includes a first profile that specifies a first mobile user's interests without identifying the first user based on historical data assessed on the first mobile user's smart phone,
accessing on the second user's mobile smart phone a second reference number which includes a second profile that specifies a second mobile user's interests without identifying the second user based on historical data assessed on the second mobile user's smart phone,
wirelessly transmitting the first reference number from the first mobile user's smart phone that is outside of the first user' home and within a viewing area of the first digital out-of-home media device after the step of storing,
receiving the wirelessly transmitted first reference number at the first digital out-of-home media device after the step of storing, while the first user is in the viewing area of the first digital out-of-home media device,
wirelessly transmitting the second reference number from the second mobile user's smart phone that is outside of the second user' home and within the viewing area of the first digital out-of-home media device while both the first user and the second user are in the viewing area of the first digital out-of-home media device, after the step of storing,
receiving the wirelessly transmitted second reference number at the first digital out-of-home media device after the step of storing, while the second user is in the viewing area of the first digital out-of-home media device,
selecting a first relevant advertisement to display on the first digital out-of-home media device while the first and second users are in the viewing area of the first digital out-of-home device based on aggregated characteristics of the wirelessly transmitted first and second reference numbers without using an address of the first user or the first user's device, without using an address of the second user or the second user's device,
wherein the step of selecting a first relevant advertisement based on aggregated characteristics selects the first relevant advertisement from the set of advertisements stored locally at the location of the first digital out-of-home media device in the step of storing, without requiring access to a remote server over a communication network,
storing a first number of relevant reference numbers, including the wirelessly transmitted first and second reference numbers, wirelessly received while the first and second users are in the viewing area of the first digital out-of-home media device,
accessing on the third user's mobile smart phone a third reference number which includes a profile that specifies a third mobile user's interests without identifying the third user based on historical data assessed on the third mobile user's smart phone,
accessing on the fourth user's mobile smart phone a fourth reference number which includes a profile that specifies a fourth mobile user's interests without identifying the fourth user based on historical data assessed on the fourth mobile user's smart phone,
wherein the first, second, third, and fourth profiles are different from each other
wirelessly transmitting the third reference number from the third mobile user's smart phone that is outside of the third user' home and within a viewing area of the first digital out-of-home media device after the step of storing,
receiving the wirelessly transmitted third reference number at the first digital out-of-home media device after the step of storing, while the third user is in the viewing area of the first digital out-of-home media device,
wirelessly transmitting the fourth reference number from the fourth mobile user's smart phone that is outside of the fourth user' home and within the viewing area of the first digital out-of-home media device while both the third user and the fourth user are in the viewing area of the first digital out-of-home media device after the step of storing,
receiving the wirelessly transmitted fourth reference number at the first digital out-of-home media device after the step of storing, while the fourth user is in the viewing area of the first digital out-of-home media device,
selecting a second relevant advertisement different from the first relevant advertisement to display on the first digital out-of-home media device while the third and fourth users are in the viewing area of the first digital out-of-home device based on aggregated characteristics of the wirelessly transmitted third and fourth reference numbers without using an address of the third user, without using an address of the fourth user, without using an address of the third user's mobile device, and without using an address of the fourth user's mobile device, wherein the step of selecting a second relevant advertisement based on aggregated characteristics selects the second relevant advertisement from the set of advertisements stored locally at the location of the first digital out-of-home media device in the step of storing, without requiring access to a remote server over a communication network, storing a second number of relevant reference numbers, including the wirelessly transmitted third and fourth reference numbers, received while the third and fourth users are in the viewing area of the first digital out-of-home media device, refreshing and refining the first, second, third, and fourth reference numbers based on information received about the first, second, third, and fourth user's continuously changing history of web activity, and repeating the steps of accessing, transmitting, receiving, and selecting using the refreshed and refined reference numbers.

14. The method of claim 13 wherein the method further comprises deleting all history of previous reference numbers.

15. The method of claim 13 wherein the method further comprises resolving conflicts based on a plurality of characters corresponding to the web user's online habits within the reference number, and queuing different advertisements on a the first digital out-of-home medium, by accounting for importance of the individual characters within the reference number and according priority to advertisers based upon payment for featured presentation.

16. The method of claim 13 wherein the method further comprises recording and storing data on the first digital out-of-home media device regarding which advertisements were displayed and which reference number qualities prompted the advertisement to be displayed.

17. The method of claim 13 further including a step of intermittently receiving and storing advertisements by the first digital out-of-home media device from a server via a common carrier network.

18. The method of claim 13 wherein the reference number is made up of characters in a predetermined order which reflect the web-browsing of the user.

19. The method of claim 13 wherein the step of creating a reference number is based on both online browsing and retail purchasing habits.

20. The method of claim 13 wherein the steps of selecting are based on crowd genotypes.

21. The method of claim 13 wherein the steps of wirelessly transmitting operate through NFC.

22. The method of claim 13 wherein the steps of wirelessly transmitting operate through WiFi without using a WiFi address of the first and second user's devices to identify them.

23. The method of claim 13 wherein the steps of wirelessly transmitting operate through Bluetooth.

* * * * *